Patented Dec. 12, 1950

2,533,798

UNITED STATES PATENT OFFICE 2,533,798

2-THENYLAMINES

Howard D. Hartough, Pitman, and Seymour L. Meisel, Woodbury, N. J., assignors to Socony-Vacuum Oil Company, Incorporated, a corporation of New York No Drawing. Application July 1, 1948, Serial No. 36,448

14 Claims. (Cl. 260—329)

The present invention relates to the preparation of C-substituted methylamines and, more particularly, to the preparation of 2-thenylamine in improved yields.

While the preparation of thenylamines and, particularly, of 2-thenylamine has been described in copending applications for United States Letters Patent Serial Nos. 636,511, filed December 21, 1945, in the names of Howard D. Hartough and Sigmund J. Lukasiewicz; 725,160, filed January 29, 1947, in the names of Howard D. Hartough and Sigmund J. Lukasiewicz, now Patent 2,497,067; and 740,194, filed April 9, 1947, in the names of Howard D. Hartough and Sigmund J. Lukasiewicz, now Patent 2,492,294, it has now been discovered that C-substituted methylamines and, particularly, 2-thenylamines can be prepared in far better yields than heretofore. The novel process of preparing C-substituted methylamine includes preparation of the corresponding formaldimines and alcoholysis of the formaldimines.

The C-substituted methylamines are those compounds, including 2-thenylamine, which may be considered as substituted methylamines in which a hydrogen atom attached to the carbon of the methyl group is replaced by the residue of a compound having a hydrogen atom of pronounced reactivity and capable of participating in the Mannich reaction. This may be readily comprehended by consideration of the following:

Methylamine is represented by the formula $CH_3NH_2$ and dimethylamine by the formula, $(CH_3)_2NH$. The novel compounds are represented by the generic formulae $RCH_2NH_2$ and $$(RCH_2)_2NH$$

where R is the residue of a compound having a hydrogen atom of pronounced reactivity and capable of participating in the Mannich reaction. The compounds having a hydrogen atom of pronounced reactivity and capable of participating in the Mannich reaction include thiophene, furan, pyrrole, ketones, such as acetone, methylethyl ketone, cyclohexanone, and malonic acids such as benzylmalonic acid, and the like.

The reaction may be said to be represented by the following equations:

(1) $\quad RH + CH_2O + NH_4Cl \longrightarrow R-CH_2N=CH_2$
$\quad\quad\quad\quad\quad\quad\quad\quad\quad\quad\quad\quad\quad\quad\quad\quad\quad\quad\quad\quad\quad$ HCl (2)
$R-CH_2N=CH_2 + 2R'OH \longrightarrow RCH_2NH_2HCl + CH_2(OR)_2$
HCl where H is a hydrogen atom of pronounced reactivity and R is the residue of a compound having the hydrogen atom of pronounced reactivity.

The 2-thenylamines are those compounds, including 2-thenylamine,

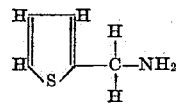

which may be considered as substituted 2-thenylamines and correspond to the generic formula

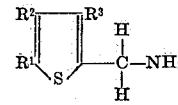

where $R^1$, $R^2$, and $R^3$ are hydrogen, alkyl, aryl, aralkyl, halogens or in general a stable electropositive substituent group other than the unstable hydroxyl or amino groups.

N-(2-thenyl)formaldimine has a composition corresponding to the formula

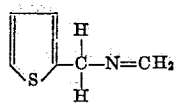

and substituted N-(2-thenyl)formaldimines have a composition corresponding to

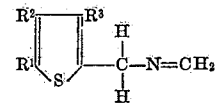

where $R^1$, $R^2$, and $R^3$ have the same significance as hereinbefore. The preparation of N-(2-thenyl)formaldimines has been described in the copending application for United States Letters Patent Serial No. 782,961, filed October 29, 1947, in the name of Howard D. Hartough. The preparation of N-(2-thenyl)formaldimine, N-(5-methyl-2-thenyl)formaldimine and N-(tertiary-butyl-2-thenyl)formaldimine is specifically described therein.

The present invention is based upon the discovery that formaldimines hydrolyze in aqueous acid solution in the presence of alcohols to yield amines in accordance with the following equations:

(3)
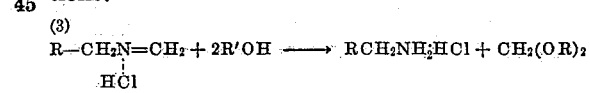
HCl

Similarly N-thenylformaldimines hydrolyze in accordance with the following equations:

(4) $C_4H_4S + CH_2O + NH_4Cl \longrightarrow C_4H_3S-CH_2N=CH_2$
HCl

N-thenylformaldimine (5)
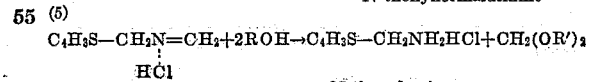
HCl

N-thenylamine

When a polymer of formaldehyde, such as paraformaldehyde, and acetic acid are used in place of an aqueous solution of formaldehyde, dithenylamine is obtained in yields as high as about 40 per cent together with about 20 per cent of thenylamine. (Yields based upon the thiophene reacted.) Dithenylamine has a composition corresponding to the formula,

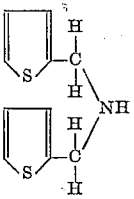

In addition to the dithenylamine and thenylamine higher amines are also obtained.

There seems to be no specificity attached to the particular alcohol used. In fact, the alcohol may be monohydric or polyhydric. The only limitation upon the alcohol is one related to practical considerations, to wit: that the unreacted alcohol be readily removed from the reaction mixture and that the formal likewise be readily separated from the desired products. For these reasons it is preferred to use the lower monohydric alcohols such as methanol. Methanol has a lower boiling point than thiophene, 64.7° C. as compared with 84° C. for thiophene and the dimethyl formal has a low boiling point of 42.5° C. However, when higher boiling derivatives of thiophene are used correspondingly higher boiling mono- or polyhydric alcohols can be used if desired. In general, it is preferred to use mono- or polyhydric alcohols having boiling points not greater than about 150° C.

The N-thenylamines may be prepared from the corresponding formaldimines after isolation of the latter from the reaction mixture or the thenylamines may be prepared in situ. The latter is the preferred method.

The preparation of formaldimines has been described in copending application for United States Letters Patent Serial No. 782,962. This method involves mixing an ammonium salt such as the halide, formaldehyde and a compound having at least one hydrogen atom of pronounced reactivity, heating the resultant mixture to initiate the reaction, thereafter cooling the mixture to ambient temperatures and recovering the formaldimine. The formaldimine is then hydrolyzed in the presence of an alcohol. The reaction can be represented by the following equation in which R represents a compound having at least one hydrogen atom of pronounced reactivity capable of undergoing the Mannich reaction.

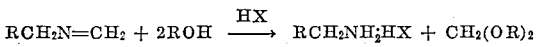

$$RCH_2N=CH_2 + 2ROH \xrightarrow{HX} RCH_2NH_2HX + CH_2(OR)_2$$

EXAMPLE I

About 12.5 parts by weight of N-(2-thenyl) formaldimine (about 0.1 mole) was dissolved in about 150 parts by volume of methanol. About 10 parts (about 0.1 mole) by volume of concentrated aqueous hydrochloric acid were added and the reaction mixture refluxed through a 12-plate fractionating column. A temperature of 45°–47° C. was attained in the column (pure methylal boils at 42.3° C.). The methylal was collected and a 2,4-dinitrophenylhydrazone of formaldehyde, melting point 165° C., was prepared from the methylal by standard procedures. Since no formaldehyde per se was present in the reaction mixture it follows that the methylal was produced from the formaldimine.

EXAMPLE II

About 4 moles of thiophene and about 4 moles of ammonium chloride were mixed and about 8 moles of aqueous 36 per cent formaldehyde solution were added to the mixture. The reaction mixture was heated to 68° C., the external source of heat removed and the temperature of the reaction controlled at about 68° C. by means of external cooling. After the heat of reaction had been dissipated, the mixture was stirred for about 15 minutes and then cooled to ambient temperatures. The reaction mixture was diluted with 300 parts by volume of methanol and distilled. However, since the odor of formaldehyde still was prevalent an additional 300 parts by volume of methanol were added and the mixture allowed to stand for about 16 hours. Thereafter the mixture was distilled and a distillate amounting to 187 parts by weight (containing 50 per cent thiophene) was obtained. A heavy oily layer of about 30 parts by weight was separated from the aqueous still residue. The aqueous layer was neutralized with about 4 moles of aqueous 40 per cent caustic soda, extracted with benzene and the extract distilled to remove the benzene. About 56.5 parts by weight of 2-thenylamine having a boiling point of 75° C., at a pressure of 5 millimeters of mercury, and a refractive index, $n_D^{20}$, of 1.5636 were recovered. This yield is equivalent to 40 per cent of theory based upon the amount of thiophene reacted. In addition to the 2-thenylamine about 31 parts by weight of N-(2-thenyl) formaldimine having a boiling point of 137° to 140° C., at a pressure of 3 millimeters of mercury, and a refractive index, $n_D^{20}$, of 1.6019 were recovered. A still residue amounting to about 86.5 parts by weight was also obtained and will be discussed hereinafter.

EXAMPLE III

The procedure described under Example II was repeated with some changes. Thus, about 4 moles of thiophene and about 4 moles of ammonium chloride were mixed and about 6 moles of aqueous 36 per cent formaldehyde solution were added. The reaction mixture was heated to about 68° C., the external source of heat removed, and the reaction temperature maintained substantially constant for about 15 minutes by external cooling. Agitation of the reaction mixture was continued until the reaction temperature dropped to 40°–50° C. Thereafter about 3 moles of unreacted thiophene were removed. Five hundred parts by volume of methanol were added and the mixture allowed to stand for about 16 hours. The methylal and methanol were removed by distillation; the distillation being discontinued when the pot temperature reached 90° C. The still residue was neutralized with aqueous alkaline solution, the amines taken up in ether and rectified. The yield of 2-thenylamine was 64 parts by weight equivalent to about 58 per cent of theory based upon the reacted thiophene. In addition 17 parts by weight of a product having a boiling point of 116°–120° C., at a pressure of 5 millimeters of mercury, and a refractive index, $n_D^{20}$, of 1.5708 and 45 parts by weight of still residue were obtained.

EXAMPLE IV

The procedure described under Example II was repeated with this exception, the reaction mixture was warmed to about 70° C. and refluxed at 70° C. for one hour after the initial heat of reaction had subsided. About 2.4 moles of unreacted thiophene were removed and about 60 parts by weight of 2-thenylamine was recovered. In other words, a yield of 34 per cent based upon the reacted thiophene was achieved instead of 58 per cent of theory. In addition, 13.5 parts by weight of a material boiling in the range, 90°–125° C., at a pressure of 7 millimeters of mercury and having a refractive index, $n_D^{20}$, of 1.5576 together with about 93 parts by weight of still residue were obtained. When the latter high boiling still residue was subjected to oxidation by alkaline permanganate in the conventional manner 2,5-thiophene-dicarboxylic acid having a melting point of 358.5°–359.5° C. was obtained.

EXAMPLE V

The procedure described under Example III was followed using about 10 moles of thiophene, about 15 moles of methanol-free aqueous 30 per cent formaldehyde solution and about 8 moles of ammonium chloride. The temperature of the reaction was maintained at 70°–71° C., for 30 minutes by means of external cooling. Unreacted thiophene was removed and 1000 parts by volume of methanol used for the alcoholysis. Distillation of the residue of the extract from the aqueous layer of the still residue achieved the following results:

Table I

| Fraction No. | Still Temp., °C. | Vapor Temp., °C. | Pressure mm. of Hg | Parts by Weight | $n_D^{30}$ |
|---|---|---|---|---|---|
| IBP | 74 | 57 | 3 | | |
| 1 | 85 | 57 | 3 | 69.5 | 1.5580 |
| 2 | 90 | 57 | 3 | 19 | |
| 3 | 125 | 75 | 3 | 39 | 1.5570 |
| 4 | 150 | 98 | 2 | 20 | 1.5608 |
| 5 | 163 | 110 | 2 | 12.5 | 1.5636 |
| 6 | 182 | 142 | 2 | 14 | 1.5694 |
| 7 | 200 | 146 | 2 | 20 | 1.5776 |
| 8 | 210 | 166 | 2 | 37 | 1.5828 |
| Residue | (¹) | | | 192 | |
| Total | | | | 429 | |

¹ Solidified at 210+.

Fractions 4 through 8 (both included) were redistilled with the following results:

Table II

| Fraction No. | Still Temp., °C. | Vapor Temp., °C. | Pressure mm. of Hg | Parts by Weight | $n_D^{30}$ |
|---|---|---|---|---|---|
| IBP | 75 | 62 | 3.8 | | |
| 1a | 85 | 70 | 3.5 | 20 | 1.5598 |
| 2a | 130 | 90 | 2.7 | 9 | 1.5582 |
| 3a | 135 | 119 | 2.3 | 5 | 1.5506 |
| 4a | 145 | 123–124 | 2.3 | 8 | 1.5578 |
| Cut 8 added: | | | | | |
| 5a | 150 | 70–122 | 2.3 | .7 | |
| 6a | 153 | 135 | 2.1 | 6.5 | 1.5670 |
| 7a | 170 | 147 | 1.6 | 11.5 | 1.5838 |
| 8a | 230 | 160 | 1.6 | 12 | 1.5920 |

Investigation of these fractions established that fractions 1a and 2a are essentially 2-thenylamine. Fraction 4a was analyzed for nitrogen and sulfur with the following results: Nitrogen 7.77 per cent; sulfur 23.20 per cent. Treatment of a portion of fraction 4a with phenylisothiocyanate yielded a phenylthiourea. The purified phenylthiourea had a melting point of 100°–101° C. It would appear from data presently available that the essential ingredient of fraction 4a is

For example, when oxidized in the conventional manner with alkaline permanganate 2,5-thiophene-dicarboxylic acid is formed. The phenylthiourea when analyzed yielded the following results: carbon 57.28 per cent; hydrogen 5.61 per cent; nitrogen 9.76 per cent; and sulfur 21.92 per cent. The composition calculated for the empirical formula $C_{14}H_{16}N_2OS_2$ is carbon 57.53 per cent; hydrogen 5.48 per cent; nitrogen 9.63 per cent; and sulfur 21.92 per cent. Therefore the structure of the phenylthiourea is:

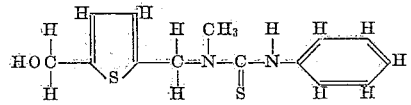

from which it follows that the essential ingredient of fraction 4a is

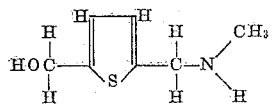

EXAMPLE VI

About 10 moles of thiophene, about 10 moles of paraformaldehyde and about 5 moles of ammonium chloride were mixed. To the mixture about 100 parts by volume (95 parts by weight) of acetic acid were added and the reaction otherwise processed in the manner described under Example III. That is to say, the mixture was heated to 66° C. to initiate the reaction. Thereafter the temperature was maintained by means of an ice-bath at 66°–69° C. for twenty-five minutes. After the temperature fell, about 4.5 moles of unreacted thiophene were recovered. After the removal of the thiophene, about 1000 parts by volume of methanol were added and the reaction mixture treated as described under Example III. Distillation yielded 116.5 parts by weight of 2-thenylamine (a yield of 21 per cent of theory based upon the thiophene reacted) and about 116.5 parts by weight of di-(2-thenyl)-amine having a boiling point of 141°–144° C., at a pressure of 2 millimeters of mercury, and a refractive index, $n_D^{30}$, of 1.5968. This represents a yield of 22 per cent of theory based upon the amount of thiophene reacted. A still residue of 216 parts by weight was also obtained. The composition and characteristics of the still residue will be discussed hereinafter.

EXAMPLE VII

The procedure described under Example VI was repeated with great exactitude except that the reaction temperature was maintained by external cooling between 65° and 67° C. About 4.75 moles of unreacted thiophene were recovered. The yield of 2-thenylamine was about 20 per cent of theory and the yield of di-(2-thenyl)-amine about 32 per cent of theory.

EXAMPLE VIII

About 5 moles of thiophene and about 10 moles of paraformaldehyde were mixed. About 5 moles of ammonium chloride and about one mole of water were added to the mixture. The reaction mixture was warmed to 65° C. and the temperature of the reaction mixture held at 67° C. by means of an ice-bath for thirty minutes. No thiophene could be recovered. About 1000 parts by volume of methanol were added and the mixture processed as described hereinbefore. A yield of about 22 per cent of 2-thenylamine was obtained. However, a fraction having a boiling range of 118° to 160° C. at a pressure of 4 millimeters of mercury contained only a trace of di-(2-thenyl)amine. This higher boiling fraction will be discussed hereinafter.

A comparison of the results obtained in Examples VII and VIII establishes that acetic acid or an acid having an ionization constant of about $1\times10^{-4}$ to about $1\times10^{-6}$ must be present if di-(2-thenyl)amine is to be obtained in significant yields.

EXAMPLE IX

About 4 moles of thiophene and about 4 moles of ammonium chloride were mixed. About 8 moles of aqueous 36 per cent formaldehyde solution and about 100 parts by volume of acetic acid were added to the reaction mixture. The temperature of the reaction was maintained as in Example III. About 1.8 moles of unreacted thiophene were recovered. A yield of 36 per cent of theory of 2-thenylamine was obtained as compared with a yield of 58 per cent of theory in Example III.

In addition about 19 parts by weight of a material having a boiling range of 123°–133° C. at a pressure of 2.2 millimeters of mercury were recovered. This material contained little, if any, di-(2-thenyl)amines and corresponds in various characteristics to the distillate obtained in Example III.

Thus, it would appear, that the action of acetic acid or acids having an ionization constant of about $2\times10^{-5}$ with paraformaldehyde to increase the yield of di-(2-thenyl)amine is specific.

EXAMPLE X

About 20 moles of formaldehyde in the form of an aqueous 36 per cent solution thereof and about 10 moles of ammonium chloride were added to about 5 moles of 3-methylthiophene. Thereafter the temperature of the reaction mixture rose to about 50° C. and was maintained within the interval 45° C. to 50° C. by means of external cooling for about forty-five minutes. At this time substantially no 3-methylthiophene remained in the reaction mixture. Thereafter about 33 moles of methanol were added and the mixture allowed to stand at room temperature for about sixteen hours. The alcohol was distilled and the amine recovered as described hereinbefore. A 31 per cent yield of 3-methyl-2-thenylamine having a boiling point of 78° C., at a pressure of 4.2 millimeters of mercury and a refractive index, $n_D^{20}$, of 1.5772 was obtained. The product was oxidized in the conventional manner with alkaline permanganate to 3-methyl-2-thiophenecarboxylic acid having a melting point of 146°–147° C. A melting point determination of this acid when mixed with an authentic sample of 3-methyl-2-thiophenecarboxylic acid showed no depression.

EXAMPLE XI

About 20 moles of formaldehyde in the form of an aqueous 36 per cent solution thereof and about 10 moles of ammonium chloride were added to about 5 moles of thiophene. The well-stirred mixture was heated to about 60° C., and the source of external heat removed. Thereafter the temperature of the reaction was maintained at about 64° to about 65° C., for about forty-five minutes. (It is important to maintain the reaction temperature at about 65° C. since the yield decreases if the reaction temperature is allowed to rise to about 68° C. or above.) The reaction mixture was then stirred until the temperature of the reaction mixture fell to ambient temperature and about 50 moles of methanol were added. (The amount of alcohol is not critical it being an excess of the stoichiometric amount.) The alcoholysis was allowed to proceed for about sixteen hours after which the reaction mixture was treated as described hereinbefore to recover the thenylamines.

After removal of the alcohol the product was distilled and fractions obtained as indicated in the following table.

Table III

| Cut | B. P., °C. | Pressure mm. of Hg | $n_D^{20}$ | Parts by Weight |
|---|---|---|---|---|
| IBP | 60 | 3.5 | | |
| 1 | 62 | 3.5 | 1.5628 | 111 |
| 2 | 65 | 4.0 | 1.5630 | 107 |
| 3 | 66 | 4.0 | 1.5626 | 21 |
| 4 | 66 | 4.0 | 1.5624 | 10 |
| 5 | 67 | 4.0 | 1.5620 | 6 |
| 6 | 100 | 4.0 | 1.5628 | 7 |
| 7 | 132 | 4.0 | 1.5670 | 14 |
| 8 | 135 | 4.0 | 1.5750 | 22 |
| Residue | | | | 200 |
| | | | | 498 |

The principal constituent of cuts 1–5 (both inclusive) is 2-thenylamine. Cuts 6–8 (both inclusive) contain some di-(2-thenyl)amine.

EXAMPLE XII

About 4 moles of formaldehyde (as an aqueous 36 per cent solution thereof) and about 2 moles of ammonium chloride were added to about 2 moles of 2-methylthiophene. The temperature of the reaction mixture was maintained at about 35°–40° C. for about four hours by means of external cooling. The di-(5-methyl-2-thenyl)-amine hydrochloride crystallized and was separated in 57 per cent yield. When recrystallized from water the di-(5-methyl-2-thenyl)amine hydrochloride had a melting point of 216° to 217° C.

About 8 moles of methanol (an excess) was added to the filtrate from the crystals of di-(5-methyl-2-thenyl)amine hydrochloride and the reaction mixture stirred for about sixteen hours. The methanol and methylal were distilled at a pot temperature of 90° C. The residue was cooled to ambient temperatures, neutralized with an aqueous 40 per cent sodium hydroxide solution, cooled to ambient temperatures again, and the amine extracted from the neutralized aqueous solution with ether. After distillation of the ether the 5-methyl-2-thenylamine in 16 per cent yield distilled at 67°–68° C., at a pressure of 3 millimeters of mercury and had a refractive index, $n_D^{20}$, of 1.5514. The phenylthiourea thereof and the hydrochloride had melting points of 133°–134° C. and 196°–197° C., respectively.

EXAMPLE XIII

About 2 moles of paraformaldehyde and about 1 mole of ammonium chloride together with about 0.34 mole of acetic acid were added to about 1 mole of 2-chlorothiophene. The mixture was agitated at 70°–75° C. for about two hours, cooled to ambient temperatures and the di-(5-chloro-2-thenyl)amine hydrochloride in the amount of about 26 parts by weight filtered off. This hydrochloride had a melting point of 240°–242° C. From the filtrate about 50 parts by weight of unreacted 2-chlorothiophene were recovered. The filtrate from the hydrochloride crystals was then treated as described in Example XII. Upon distillation 5-chloro-2-thenylamine having a boiling point of 71° C., at a pressure of 2 millimeters of mercury and a refractive index, $n_D^{20}$, of 1.5630 was obtained in 18 per cent yield. A phenythiourea of this amine melted at 119.5°–120° C.

EXAMPLE XIV

About 1 mole of tertiary-butylthiophene, about 2 moles of formaldehyde (aqueous 36 per cent solution) and about 1 mole of ammonium chloride were mixed and held at a temperature of about 70°–80° C. for about three hours. An excess of methanol was added and the solution agitated for about sixteen hours. The excess unreacted methanol and the methylal together with about 0.5 mole of unreacted tertiary-butylthiophene were removed by distillation. The residue from the distillation was neutralized and extracted with ethyl ether. The ethyl ether was removed from the extract and the residue of the extract distilled to yield the fractions tabulated hereinafter.

*Table IV*

| Cut | B. P., ° C. | Pressure mm. of Hg | $n_D^{20}$ | Parts by Weight |
|---|---|---|---|---|
| 1 | 75 | 2.5 | 1.5038 | 5 |
| 2 | 75 | 2.5 | 1.5040 | 2 |
| 3 | 78 | 1.5 | 1.5048 | 13 |
| 4 | 85 | 1.5 | 1.5110 | 9 |
| 5 | 125 | 1.5 | 1.5230 | 5 |
| Residue | | | | 24 |
| | | | | 58 |

Cut 3 yielded a phenylthiourea having a melting point of 130°–131° C. and an alpha-naphthylurea having a melting point of 185°–186° C. both of which upon analysis proved to be derivatives of tertiary butyl-2-thenylamine.

The foregoing examples are illustrative of the production of substituted methylamines, RCH$_2$NH$_2$ and (RCH$_2$)$_2$NH, wherein R is the residue of a compound having at least one hydrogen of pronounced reactivity capable of undergoing the Mannich reaction which comprises reacting a compound having at least one hydrogen of pronounced reactivity capable of undergoing the Mannich reaction with ammonium halide and paraformaldehyde in the presence of an acid such as acetic acid, having an ionization constant of about $1 \times 10^{-4}$ to about $1 \times 10^{-6}$, separating the unreacted compound capable of undergoing the Mannich reaction, adding an alcohol and recovering primary and secondary amines corresponding respectively to the formulae RCH$_2$NH$_2$ and (RCH$_2$)$_2$NH where R has the same significance as given hereinbefore.

We claim:

1. A method of preparing a thenylamine which comprises treating a thenylformaldimine with alcohol in acid solution.

2. A method of preparing a thenylamine which comprises reacting a thenylformaldimine and an alcohol in the presence of at least a mole equivalent of acid based upon the formaldimine.

3. A method of preparing 2-thenylamine which comprises reacting thiophene, ammonium halide and formaldehyde at a temperature not greater than about 70° C., cooling the reaction mixture to at least 50° C., removing unreacted thiophene, adding an alcohol, and recovering 2-thenylamine.

4. A method of preparing 2-thenylamine which comprises reacting thiophene, ammonium halide and formaldehyde at a temperature not greater than about 70° C., removing unreacted thiophene, adding an alcohol, and recovering 2-thenylamine.

5. A method of preparing substituted 2-thenylamine which comprises reacting a thiophene derivative having at least one unsubstituted alpha position, ammonium halide and formaldehyde at a temperature not greater than about 70° C., recovering unreacted thiophene derivative, adding an alcohol and recovering substituted 2-thenylamine.

6. A method for preparing 2-thenylamine and the secondary amine di-(2-thenyl)amine, which comprises reacting thiophene, ammonium halide and paraformaldehyde in the presence of an acid having an ionization constant of about $1 \times 10^{-4}$ to about $1 \times 10^{-6}$ separating unreacted thiophene, adding an alcohol, and recovering 2-thenylamine and di-(2-thenyl)amine.

7. As a new composition of matter, 5-hydroxymethyl-2-thenyl, N-methyl amine having a composition corresponding to the formula

HOCH$_2$C$_4$H$_2$SCH$_2$NHCH$_3$ boiling at 123°–124° C., at a pressure of 2.3 millimeters of mercury, forming a phenylthiourea having a melting point of 100°–101° C. and containing about 57.53 per cent carbon, about 5.48 per cent hydrogen, about 9.63 per cent nitrogen, about 21.92 per cent sulfur and about 5.44 per cent oxygen.

8. As a new composition of matter, di-(5-methyl-2-thenyl)amine having in the form of the hydrochloride a melting point of about 216° to 217° C.

9. As a new composition of matter, di-(5-chloro-2-thenyl)amine having in the form of the hydrochloride a melting point of about 240°–242° C.

10. As a new composition of matter, 5-chloro-2-thenylamine having a boiling point of 71° C. at a pressure of 2 millimeters of mercury, a refractive index, $n_D^{20}$, of 1.5630 and yielding a phenylthiourea having a melting point of 119.5°–120° C.

11. As a new composition of matter, 3-methyl-2-thenylamine having a boiling point of 78° C., at a pressure of 4.2 millimeters of mercury and a refractive index, $n_D^{20}$, of 1.5572 and yielding a phenylthiourea having a melting point of 137°–138° C.

12. A method for preparing thenylamines, which comprises reacting a thiophenic reactant comprising a thiophene having at least one unsubstituted alpha position, ammonium halide and paraformaldehyde in the presence of an acid having an ionization constant of about $1 \times 10^{-4}$ to about $1 \times 10^{-6}$, separating the unreacted portion of said thiophenic reactant, adding an alcohol and recovering primary and secondary thenylamines.

13. A method for preparing thenylamines, which comprises reacting a thiophenic reactant comprising a thiophene having at least one unsubstituted alpha position, ammonium halide and paraformaldehyde in the presence of solvent quantities of acetic acid, separating the unreacted portion of said thiophenic reactant, adding an alcohol, and recovering primary and secondary thenylamines.

14. As a new composition of matter, a thenylamine having a composition corresponding to the formula $$\overset{R'}{\underset{|}{R-N-H}}$$

wherein R is selected from the group consisting of 2-thenyl, 5-hydroxymethyl-2-thenyl, 5-methyl-2-thenyl, 5-chloro-2-thenyl and 3-methyl-2-thenyl, R' is selected from the group consisting of hydrogen, methyl, 2-thenyl and when one of R and R' is 2-thenyl the other is 2-thenyl.

HOWARD D. HARTOUGH.
SEYMOUR L. MEISEL.

REFERENCES CITED

The following references are of record in the file of this patent:

Organic Reactions, vol. 1, 303 ff, Wiley, N. Y., 1942.

J. Am. Chem. Soc., 70, 4013–4019 (1948).

Certificate of Correction

Patent No. 2,533,798                                        December 12, 1950

HOWARD D. HARTOUGH ET AL.

It is hereby certified that error appears in the printed specification of the above numbered patent requiring correction as follows:

Column 1, line 48, left-hand portion of Equation 1, for "RH" read $RH$; line 52, right-hand portion of Equation 2, for "$CH_2(OR)_2$" read $CH_2(OR')_2$; line 54, for "H" read $H$; column 2, line 47, right-hand portion Equation 3, for "$CH_2(OR)_2$" read $CH_2(OR')_2$; line 56, right-hand portion of Equation 5, for "$CH_2(OR')_2$" read $CH_2(OR)_2$;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*